US012794102B2

(12) United States Patent
Shibuya et al.

(10) Patent No.: US 12,794,102 B2
(45) Date of Patent: Nov. 10, 2026

(54) ELECTRONIC COMPONENT

(71) Applicant: TDK CORPORATION, Tokyo (JP)

(72) Inventors: Keigo Shibuya, Tokyo (JP); Yuta Ashida, Tokyo (JP); Misako Kudo, Tokyo (JP); Tatsuya Koyama, Tokyo (JP); Ryosuke Komatsu, Tokyo (JP); Masahiro Tatematsu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 138 days.

(21) Appl. No.: 18/588,169

(22) Filed: Feb. 27, 2024

(65) Prior Publication Data

US 2024/0313386 A1 Sep. 19, 2024

(30) Foreign Application Priority Data

Mar. 17, 2023 (JP) ................................ 2023-043284

(51) Int. Cl.
*H01P 7/06* (2006.01)

(52) U.S. Cl.
CPC ................ *H01P 7/06* (2013.01); *H01P 7/065* (2013.01)

(58) Field of Classification Search
CPC .......... H01P 7/06; H01P 1/2088; H01P 1/207; H01P 1/2002
USPC .......................................................... 333/227
See application file for complete search history.

(56) References Cited

U.S. PATENT DOCUMENTS

| | | | | |
|---|---|---|---|---|
| 2013/0229241 | A1 | 9/2013 | Imamura | |
| 2021/0005945 | A1 * | 1/2021 | Uemichi | H01P 1/2088 |
| 2022/0285809 | A1 | 9/2022 | Kikuda | |

FOREIGN PATENT DOCUMENTS

| | | | | |
|---|---|---|---|---|
| CN | 111276781 | A * | 6/2020 | H01P 1/207 |
| JP | H10-13116 | A | 1/1998 | |
| JP | H10-93311 | A | 4/1998 | |
| WO | 2012/077498 | A1 | 6/2012 | |
| WO | 2021/117354 | A1 | 6/2021 | |
| WO | 2022/138242 | A1 | 6/2022 | |

OTHER PUBLICATIONS

English Translation of CN 111276781 (Year: 2021).*
Translation of Aug. 4, 2026 Office Action issued in Japanese Patent Application No. 2023-043284.

* cited by examiner

*Primary Examiner* — Andrea Lindgren Baltzell
*Assistant Examiner* — Abigail Amir Yaldo
(74) *Attorney, Agent, or Firm* — Oliff PLC

(57) ABSTRACT

An electronic component includes an element body having a pair of main surfaces facing each other, and a resonator disposed in the element body. The resonator has a first conductor and a second conductor disposed to face each other in a facing direction of the pair of main surfaces, and a coupling conductor extending in the facing direction and coupling the first conductor and the second conductor. A resonance space is formed by the first conductor, the second conductor, and the coupling conductor. The coupling conductor includes a plurality of coupling portions. At least a part of the plurality of coupling portions extends in one direction when viewed from the facing direction.

8 Claims, 13 Drawing Sheets

ELECTRONIC COMPONENT

TECHNICAL FIELD

The present disclosure relates to an electronic component.

BACKGROUND

Patent Literature 1 (specification of US Unexamined Patent Publication No. 2022/0285809) discloses a dielectric waveguide resonator including: a dielectric plate having a first main surface and a second main surface facing each other, and a side surface connecting an outer edge of the first main surface and an outer edge of the second main surface; a first surface conductor formed on the first main surface; a second surface conductor formed on the second main surface; a coupling conductor formed inside the dielectric plate and coupling the first surface conductor and the second surface conductor; and an internal conductor extending in a direction perpendicular to the first main surface and not electrically coupled to any of the first surface conductor and the second surface conductor, and configuring a dielectric waveguide resonance space surrounded by the first surface conductor, the second surface conductor, and the coupling conductor.

SUMMARY

In a single columnar coupling conductor extending in a direction in which the first main surface and the second main surface face each other as in the conventional electronic component (dielectric waveguide resonator), an eddy current is generated in a concentrated manner in the coupling conductor due to a magnetic flux generated when a current flows, and a loss (eddy current loss) caused by the eddy current is generated, so that a Q value may decrease.

An object of one aspect of the present disclosure is to provide an electronic component capable of improving a Q value.

(1) An electronic component according to one aspect of the present disclosure includes: an element body having a pair of main surfaces facing each other; and a resonator disposed in the element body, in which the resonator has a first conductor and a second conductor disposed to face each other in a facing direction of the pair of main surfaces, and a coupling conductor extending in the facing direction and coupling the first conductor and the second conductor, a resonance space is formed by the first conductor, the second conductor, and the coupling conductor, the coupling conductor includes a plurality of coupling portions, and at least a part of the plurality of coupling portions extends in one direction when viewed from the facing direction.

In the electronic component according to one aspect of the present disclosure, the coupling conductor includes a plurality of coupling portions. In this configuration, at least a part of the plurality of coupling portions extends in one direction when viewed from the facing direction. As a result, in the electronic component, it is possible to suppress an eddy current from being generated in a concentrated manner in the coupling conductor as compared with a configuration in which the coupling conductor has a single columnar shape. Therefore, in the electronic component, a loss due to the eddy current can be reduced. Therefore, in the electronic component, a Q value can be improved.

(2) In the electronic component according to (1), the coupling conductor may be integrally provided with a plurality of the coupling portions, and may have a frame shape when viewed from the facing direction. In this configuration, the resonance space formed by the coupling conductor is completely closed. Therefore, in the electronic component, radiation from the resonance space is shielded by the coupling conductor, so that a radiation loss can be reduced. Therefore, in the electronic component, a Q value can be improved.

(3) In the electronic component according to (1), the coupling conductor may be integrally provided with a plurality of the coupling portions, and may have an L-shape when viewed from the facing direction. In this configuration, radiation from the resonance space is shielded by the coupling conductor as compared with a configuration in which a plurality of coupling conductors are disposed apart from each other, so that the radiation loss can be reduced. Therefore, in the electronic component, a Q value can be improved.

(4) In the electronic component according to any one of (1) to (3), a side surface of the coupling conductor may be provided with a plurality of depressions, and the plurality of depressions may be disposed to face each other in another direction orthogonal to the one direction and extend in the facing direction when viewed from the facing direction. In this configuration, a bonding strength between the coupling conductor and the first conductor and the second conductor can be improved.

(5) In the electronic component according to any one of (1) to (4), an internal conductor extending in the facing direction may be disposed in the resonance space. In this configuration, a frequency characteristic of the resonator can be adjusted by the internal conductor.

(6) In the electronic component according to (5), the internal conductor may be coupled to the first conductor or the second conductor. In this configuration, a wavelength can be shortened.

(7) In the electronic component according to (5), the internal conductor may not be coupled to the first conductor and the second conductor. In this configuration, a wavelength can be shortened.

(8) In the electronic component according to any one of (5) to (7), a plurality of the resonators may be disposed in the element body, and the internal conductor may be disposed in the resonance space of at least one of the plurality of resonators. In this configuration, the frequency characteristic of the resonator can be adjusted for each resonator.

According to one aspect of the present disclosure, a Q value can be improved.

DETAILED DESCRIPTION

Hereinafter, preferred embodiments of the present disclosure will be described in detail with reference to the accompanying drawings. Note that, the same or corresponding elements in the description of the drawings are denoted by the same reference signs, and redundant description is omitted.

Figure 1:
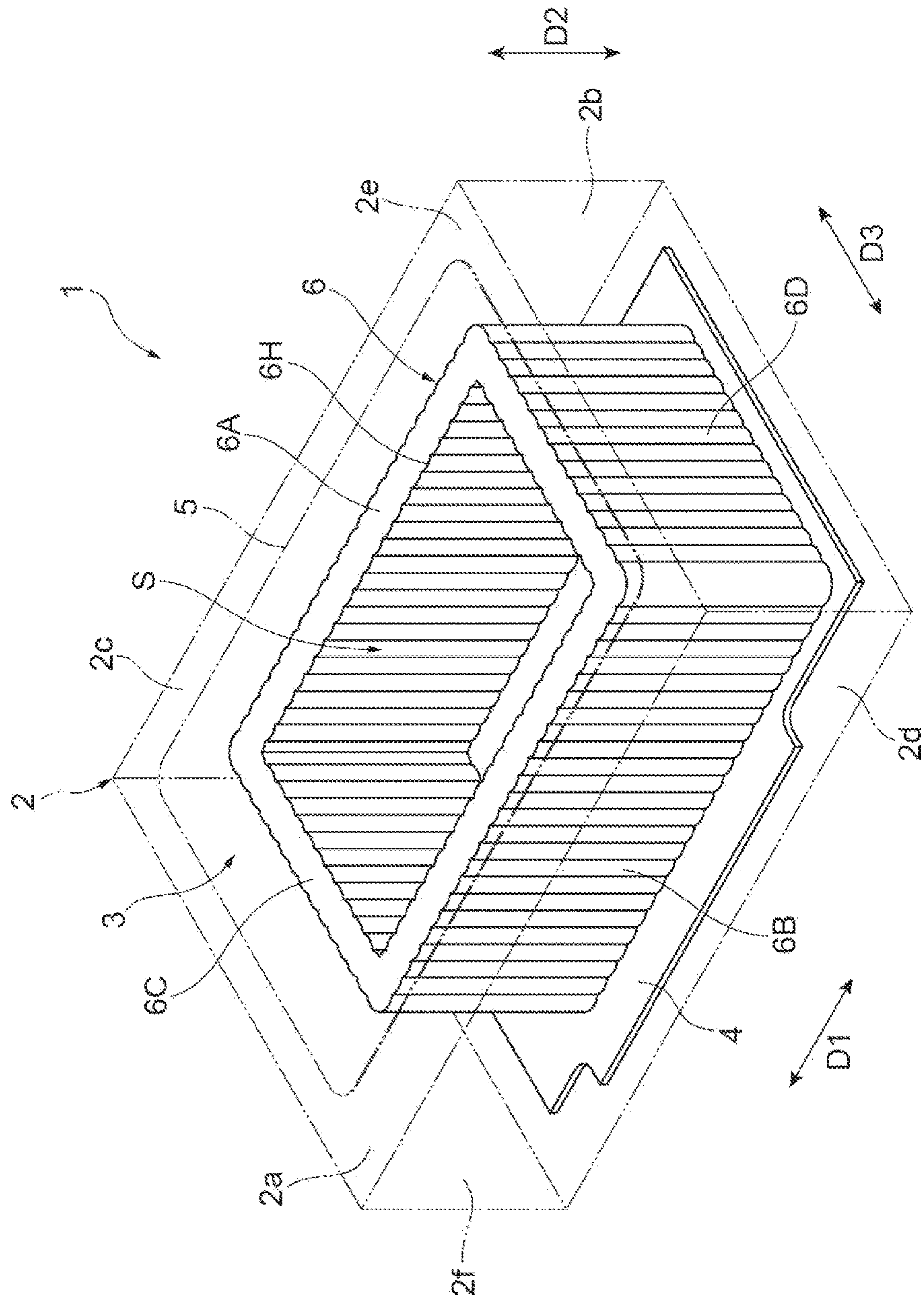
FIG. 1 is a transparent perspective view of an electronic component according to a first embodiment.
Figure 2:
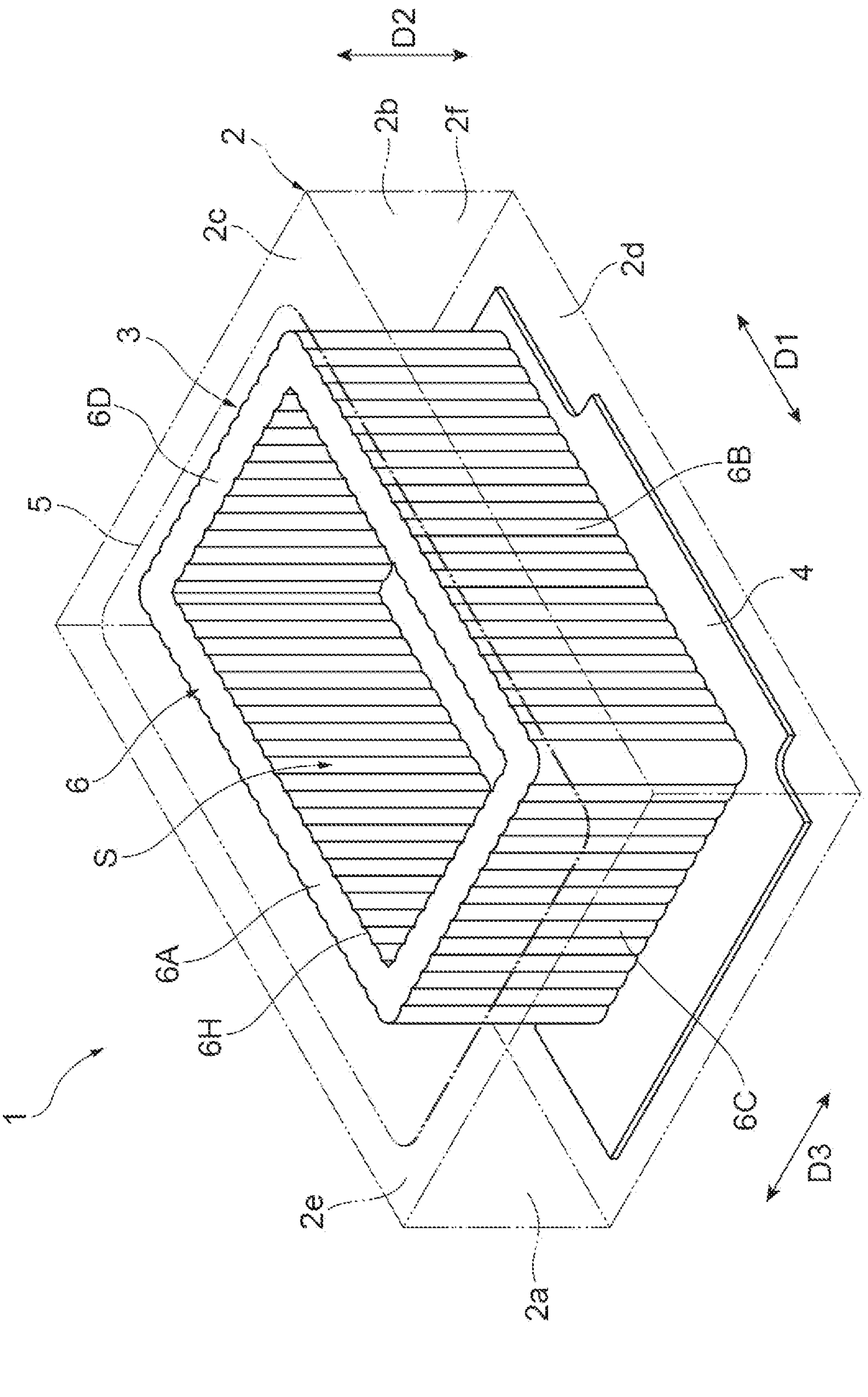
FIG. 2 is a transparent perspective view of the electronic component illustrated in FIG. 1.
Figure 3:
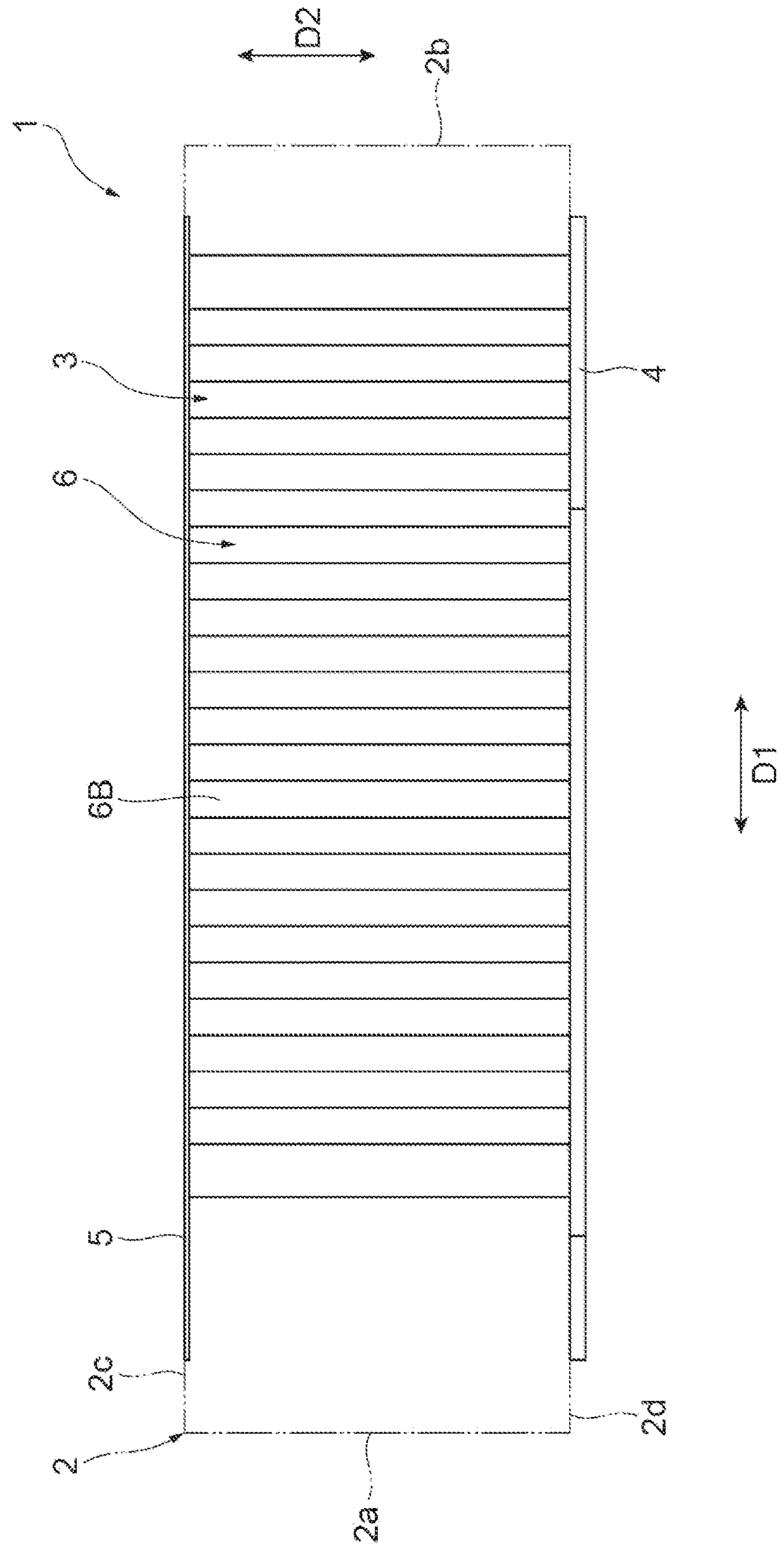
FIG. 3 is a side view of the electronic component illustrated in FIG. 1.
Figure 4:
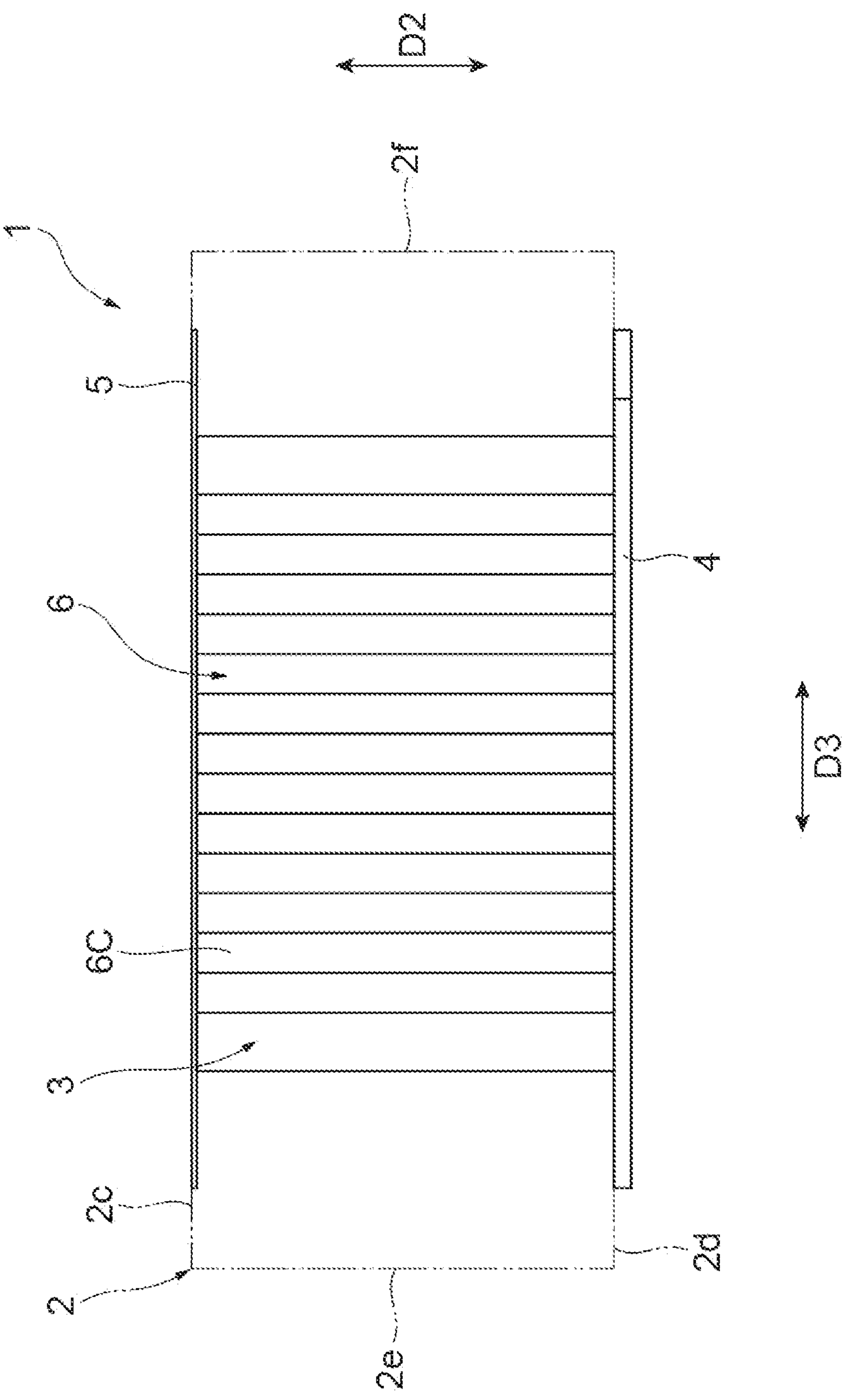
FIG. 4 is an end view of the electronic component illustrated in FIG. 1.
Figure 5:
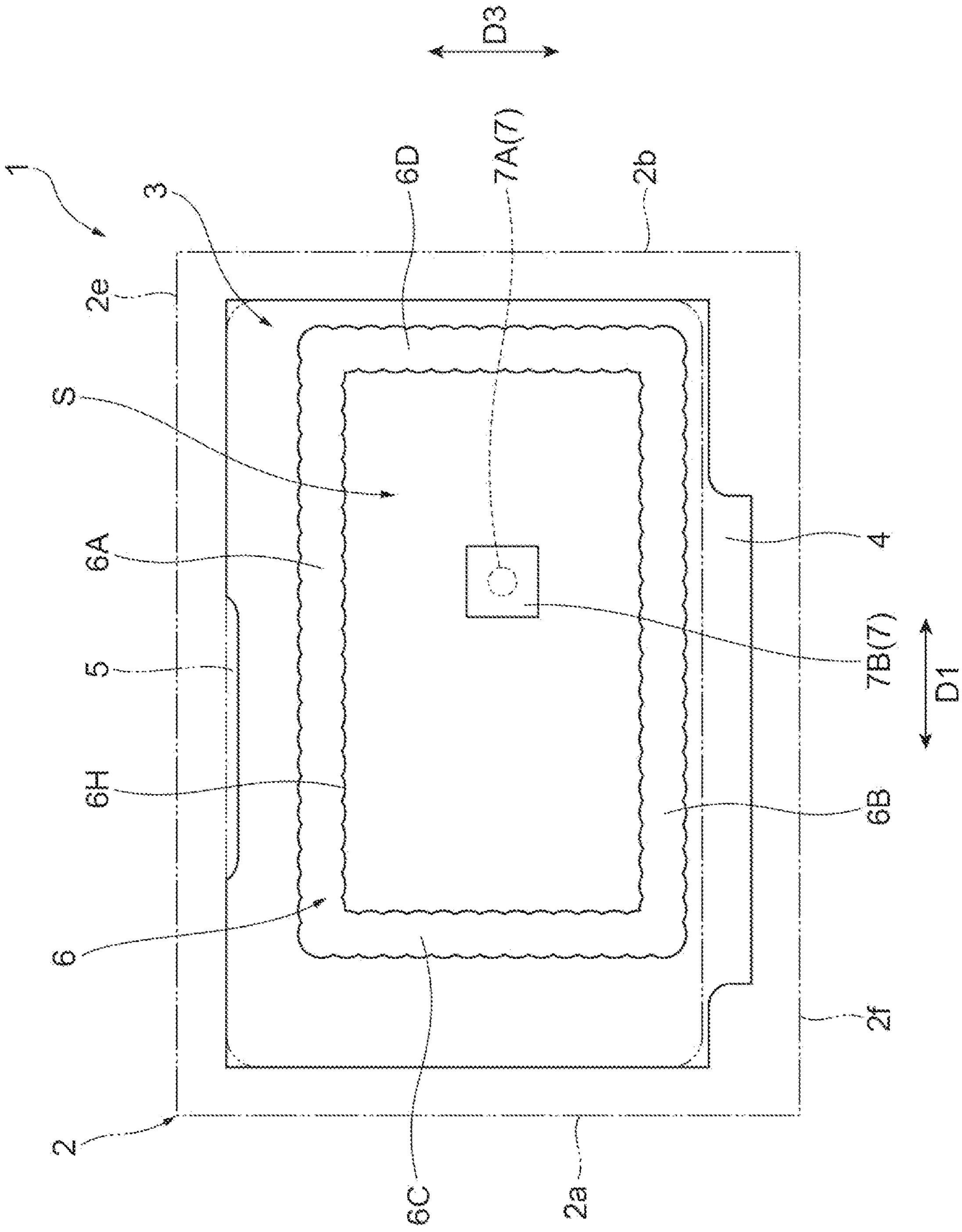
FIG. 5 is a top view of the electronic component illustrated in FIG. 1.
Figure 6:
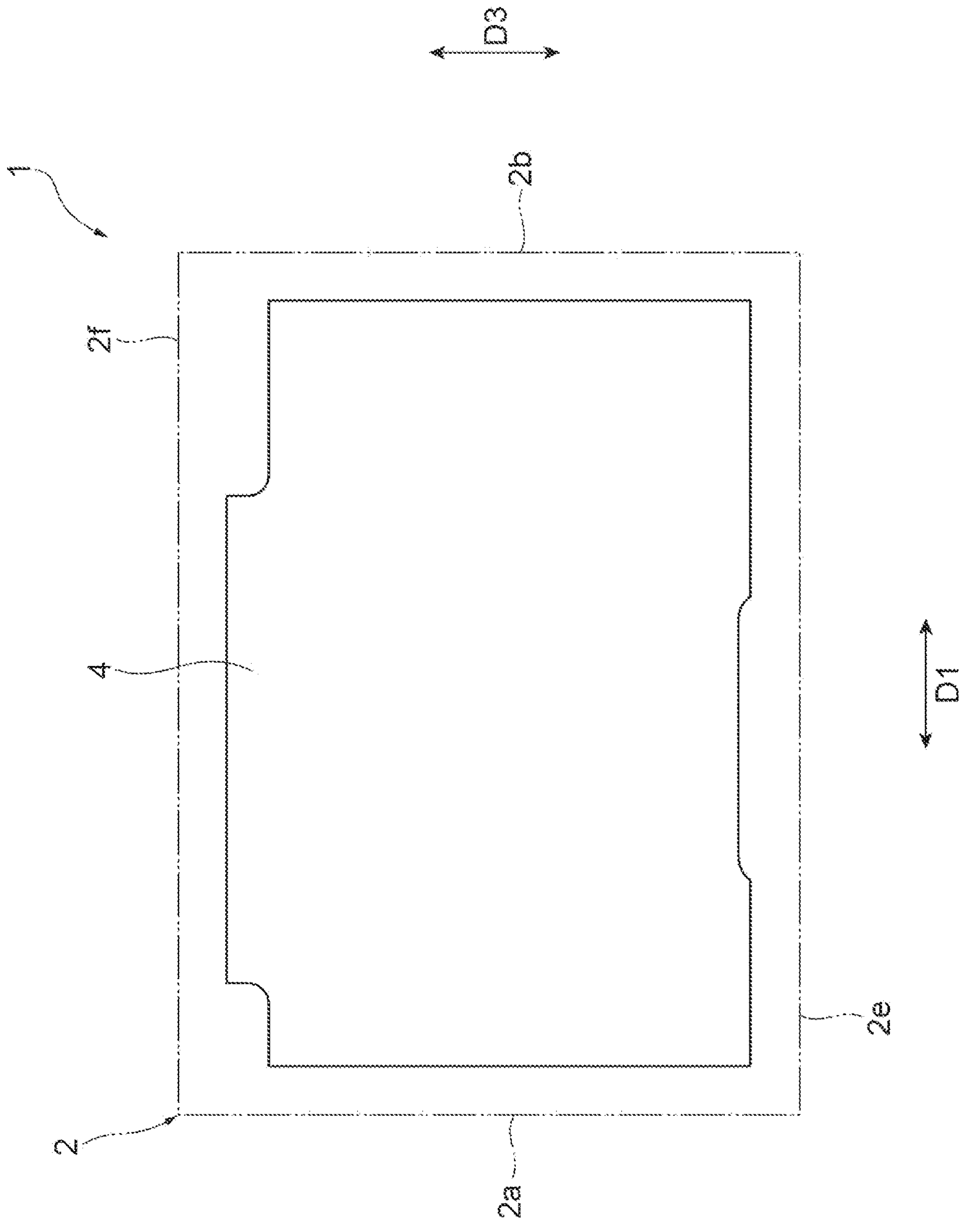
FIG. 6 is a bottom view of the electronic component illustrated in FIG. 1.

[First Embodiment] An electronic component according to a first embodiment will be described with reference to FIGS. 1, 2, 3, 4, 5, and 6. FIG. 1 is a transparent perspective view of the electronic component according to the first embodiment. FIG. 2 is a transparent perspective view of the electronic component illustrated in FIG. 1. FIG. 3 is a side view of the electronic component illustrated in FIG. 1. FIG. 4 is an end view of the electronic component illustrated in FIG. 1. FIG. 5 is a top view of the electronic component illustrated in FIG. 1. FIG. 6 is a bottom view of the electronic component illustrated in FIG. 1. As illustrated in FIGS. 1 to 6, an electronic component 1 includes an element body 2 and a resonator 3. In FIGS. 1 to 6, the element body 2 is indicated by a dashed dotted line. In FIGS. 1, 2, and 5, a second conductor 5 is indicated by a dashed dotted line.

The element body 2 has a rectangular parallelepiped shape. The rectangular parallelepiped shape includes a rectangular parallelepiped shape in which corner portions and ridge line portions are chamfered, or a rectangular parallelepiped shape in which corner portions and ridge line portions are rounded. The element body 2 has, as outer surfaces, a pair of end surfaces 2*a* and 2*b*, a pair of main surfaces 2*c* and 2*d*, and a pair of side surfaces 2*e* and 2*f*. The end surfaces 2*a* and 2*b* face each other. The main surfaces 2*c* and 2*d* face each other. The side surfaces 2*e* and 2*f* face each other. Hereinafter, a facing direction of the end surfaces 2*a* and 2*b* is referred to as a first direction D1, a facing direction of the main surfaces 2*c* and 2*d* is referred to as a second direction D2, and a facing direction of the side surfaces 2*e* and 2*f* is referred to as a third direction D3. The first direction D1, the second direction D2, and the third direction D3 are substantially orthogonal to each other.

The end surfaces 2*a* and 2*b* extend in the second direction D2 so as to be connected to the main surfaces 2*c* and 2*d*. The end surfaces 2*a* and 2*b* also extend in the third direction D3 so as to be connected to the side surfaces 2*e* and 2*f*. The main surfaces 2*c* and 2*d* extend in the first direction D1 so as to be connected to the end surfaces 2*a* and 2*b*. The main surfaces 2*c* and 2*d* also extend in the third direction D3 so as to be connected to the side surfaces 2*e* and 2*f*. The side surfaces 2*e* and 2*f* extend in the first direction D1 so as to be connected to the end surfaces 2*a* and 2*b*. The side surfaces 2*e* and 2*f* also extend in the second direction D2 so as to be connected to the main surfaces 2*c* and 2*d*.

The main surface 2*d* is an implementation surface, for example, a surface facing another electronic device (for example, circuit substrate or multilayer electronic component) when the electronic component 1 is implemented on the another electronic device (not illustrated). The end surfaces 2*a* and 2*b* are surfaces continuous from the implementation surface (that is, the main surface 2*d*).

A length of the element body 2 in the first direction D1 is longer than a length of the element body 2 in the second direction D2 and a length of the element body 2 in the third direction D3. The length of the element body 2 in the second direction D2 is shorter than the length of the element body 2 in the third direction D3. That is, in the present embodiment, the end surfaces 2*a* and 2*b*, the main surfaces 2*c* and 2*d*, and the side surfaces 2*e* and 2*f* have a rectangular shape. The length of the element body 2 in the second direction D2 may be equal to the length of the element body 2 in the third direction D3, or may be longer than the length of the element body 2 in the third direction D3.

It should be noted that "equal" in the present embodiment may mean not only "equal" but also a value including a slight difference, a manufacturing error, or the like in a preset range. For example, when a plurality of values are included within a range of ±5% of an average value of the plurality of values, the plurality of values are defined to be equal.

The element body 2 is formed by laminating a plurality of element body layers (insulating layers) (not illustrated) in the second direction D2. That is, a laminating direction of the element body 2 is the second direction D2. In the actual element body 2, the plurality of element body layers may be integrated to such an extent that boundaries between the layers cannot be visually recognized, or may be integrated such that boundaries between the layers can be visually recognized.

The element body layer is formed by using, for example, a sintered body of a ceramic green sheet containing a dielectric material. The dielectric material includes, for example, at least one selected from a $BaTiO_3$ based material, a $Ba(Ti, Zr)O_3$ based material, a $(Ba, Ca)TiO_3$ based material, a glass material, or an alumina material.

The resonator 3 includes a first conductor 4, a second conductor 5, a coupling conductor 6, and an internal conductor 7. The resonator 3 is a TE mode cavity resonator.

The first conductor 4 is disposed on the main surface 2*d* of the element body 2. The first conductor 4 has a plate shape. The first conductor 4 is made of a conductive material (for example, Cu). The first conductor 4 has a size that covers an opening 6H formed by the coupling conductor 6. The surface of the first conductor 4 protrudes from the main surface 2*d*. That is, in the present embodiment, the surface of the first conductor 4 is not flush with the main surface 2*d*.

The second conductor 5 is disposed on the main surface 2*c* side of the element body 2. The second conductor 5 has a plate shape. The second conductor 5 is made of a conductive material (for example, Cu). The second conductor 5 has a size that covers the opening 6H formed by the coupling conductor 6. In the present embodiment, the surface of the second conductor 5 is flush with the main surface 2*c* of the element body 2. That is, the second conductor 5 is embedded in the element body 2.

The coupling conductor 6 couples the first conductor 4 and the second conductor 5. The coupling conductor 6 is made of a conductive material (for example, Cu). The coupling conductor 6 extends in the second direction D2. The coupling conductor 6 has a frame shape when viewed from the second direction D2. In the present embodiment, the coupling conductor 6 has a rectangular frame shape. The coupling conductor 6 includes a plurality of conductor portions. The coupling conductor 6 has a first coupling portion 6A extending in the first direction (one direction)

D1, a second coupling portion 6B extending in the first direction D1, a third coupling portion 6C extending in the third direction (one direction) D3, and a fourth coupling portion 6D extending in the third direction D3 when viewed from the second direction D2. The first coupling portion 6A, the second coupling portion 6B, the third coupling portion 6C, and the fourth coupling portion 6D are integrally formed. The opening 6H is formed in the coupling conductor 6 by the first coupling portion 6A, the second coupling portion 6B, the third coupling portion 6C, and the fourth coupling portion 6D.

The first coupling portion 6A and the second coupling portion 6B are parallel to each other. The first coupling portion 6A and the second coupling portion 6B are disposed to face each other in the third direction D3. The third coupling portion 6C and the fourth coupling portion 6D are parallel to each other. The third coupling portion 6C and the fourth coupling portion 6D are disposed to face each other in the second direction D2.

An end portion of the first coupling portion 6A on the end surface 2*a* side is coupled to an end portion of the third coupling portion 6C on the side surface 2*e* side. An end portion of the first coupling portion 6A on the end surface 2*b* side is coupled to an end portion of the fourth coupling portion 6D on the side surface 2*e* side. An end portion of the second coupling portion 6B on the end surface 2*a* side is coupled to an end portion of the third coupling portion 6C on the side surface 2*f* side. An end portion of the second coupling portion 6B on the end surface 2*b* side is coupled to an end portion of the fourth coupling portion 6D on the side surface 2*f* side. With this configuration, the coupling conductor 6 is continuously formed when viewed from the second direction D2. That is, the coupling conductor 6 is not provided with an intermittent portion (gap).

Figure 7:
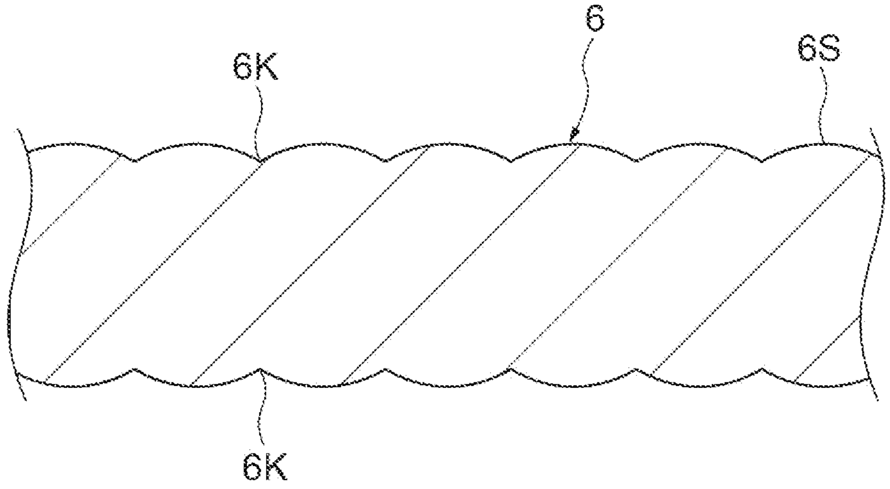
FIG. 7 is a view illustrating a cross-sectional configuration of a coupling conductor.

FIG. 7 is a view illustrating a cross-sectional configuration of the coupling conductor 6. The cross section of the coupling conductor 6 illustrated in FIG. 7 is a cross section of a plane along the first direction D1 and the third direction D3. In the present embodiment, the coupling conductor 6 has a shape in which a plurality of circles overlap. Specifically, the coupling conductor 6 has a shape in which a part of each of a pair of adjacent circles overlaps. For example, two adjacent circles overlap each other such that an outer periphery of one circle passes through a center of the other circle. A side surface 6S of the coupling conductor 6 is formed of a curved surface.

The side surface 6S of the coupling conductor 6 is provided with a plurality of depressions 6K. The depressions 6K extend in the second direction D2. In the first coupling portion 6A and the second coupling portion 6B, the depressions 6K are disposed at predetermined intervals in the first direction D1. In the third coupling portion 6C and the fourth coupling portion 6D, the depressions 6K are disposed at predetermined intervals in the third direction D3. In the first coupling portion 6A and the second coupling portion 6B, the depressions 6K are disposed at positions facing each other in the third direction (another direction) D3. In the third coupling portion 6C and the fourth coupling portion 6D, the depressions 6K are disposed at positions facing each other in the first direction (another direction) D1.

As illustrated in FIGS. 1 to 6, the first conductor 4, the second conductor 5, and the coupling conductor 6 form a resonance space S. The resonance space S is a closed space. That is, the resonance space S is not opened.

The internal conductor 7 is disposed in the resonance space S. The internal conductor 7 is provided to adjust the frequency of the resonator 3. The internal conductor 7 has a first portion 7A and a second portion 7B. The first portion 7A extends in the first direction D1. The first portion 7A is a through-hole conductor. An end portion of the first portion 7A on the main surface 2*d* side is coupled to the first conductor 4. The second portion 7B is coupled to an end portion of the first portion 7A on the main surface 2*c* side. The second portion 7B is a plate-like member. The second portion 7B has a rectangular shape when viewed from the first direction D1.

As described above, in the electronic component 1 according to the present embodiment, the coupling conductor 6 includes the first coupling portion 6A, the second coupling portion 6B, the third coupling portion 6C, and the fourth coupling portion 6D. The first coupling portion 6A, the second coupling portion 6B, the third coupling portion 6C, and the fourth coupling portion 6D extend in the first direction D1 or the third direction D3 when viewed from the second direction D2. As a result, in the electronic component 1, it is possible to suppress the eddy current from being generated in a concentrated manner in the coupling conductor 6 as compared with a configuration in which the coupling conductor has a single columnar shape. Therefore, in the electronic component 1, the loss due to the eddy current can be reduced. Therefore, in the electronic component 1, a Q value can be improved. For example, a Q value of the electronic component in which the resonator is configured by disposing the columnar coupling conductors at predetermined intervals is "340", whereas a Q value of the electronic component 1 according to the present embodiment can be "360".

In the electronic component 1 according to the present embodiment, the coupling conductor 6 is integrally provided with the first coupling portion 6A, the second coupling portion 6B, the third coupling portion 6C, and the fourth coupling portion 6D, and has a frame shape when viewed from the second direction D2. In this configuration, the resonance space S formed by the coupling conductor 6 is completely closed. Therefore, in the electronic component 1, since the radiation from the resonance space S is shielded by the coupling conductor 6, the radiation loss can be reduced. Therefore, in the electronic component 1, a Q value can be improved.

In addition, in the electronic component 1, since the radiation from the resonance space S is shielded by the coupling conductor 6, the influence of noise on other devices disposed around the electronic component 1 can be reduced.

In the electronic component 1 according to the present embodiment, the side surface 6S of the coupling conductor 6 is provided with a plurality of depressions 6K. The plurality of depressions 6K are disposed to face each other in the first direction D1 or the third direction D3 and extend in the second direction D2 when viewed from the second direction D2. In this configuration, a bonding strength between the coupling conductor 6 and the first conductor 4 and the second conductor 5 can be improved.

In the electronic component 1 according to the present embodiment, the internal conductor 7 extending in the second direction D2 is disposed in the resonance space S. The internal conductor 7 is coupled to the first conductor 4. In this configuration, a frequency characteristic of the resonator 3 can be adjusted by the internal conductor 7. In particular, a wavelength can be shortened.

Second Embodiment

Figure 8:
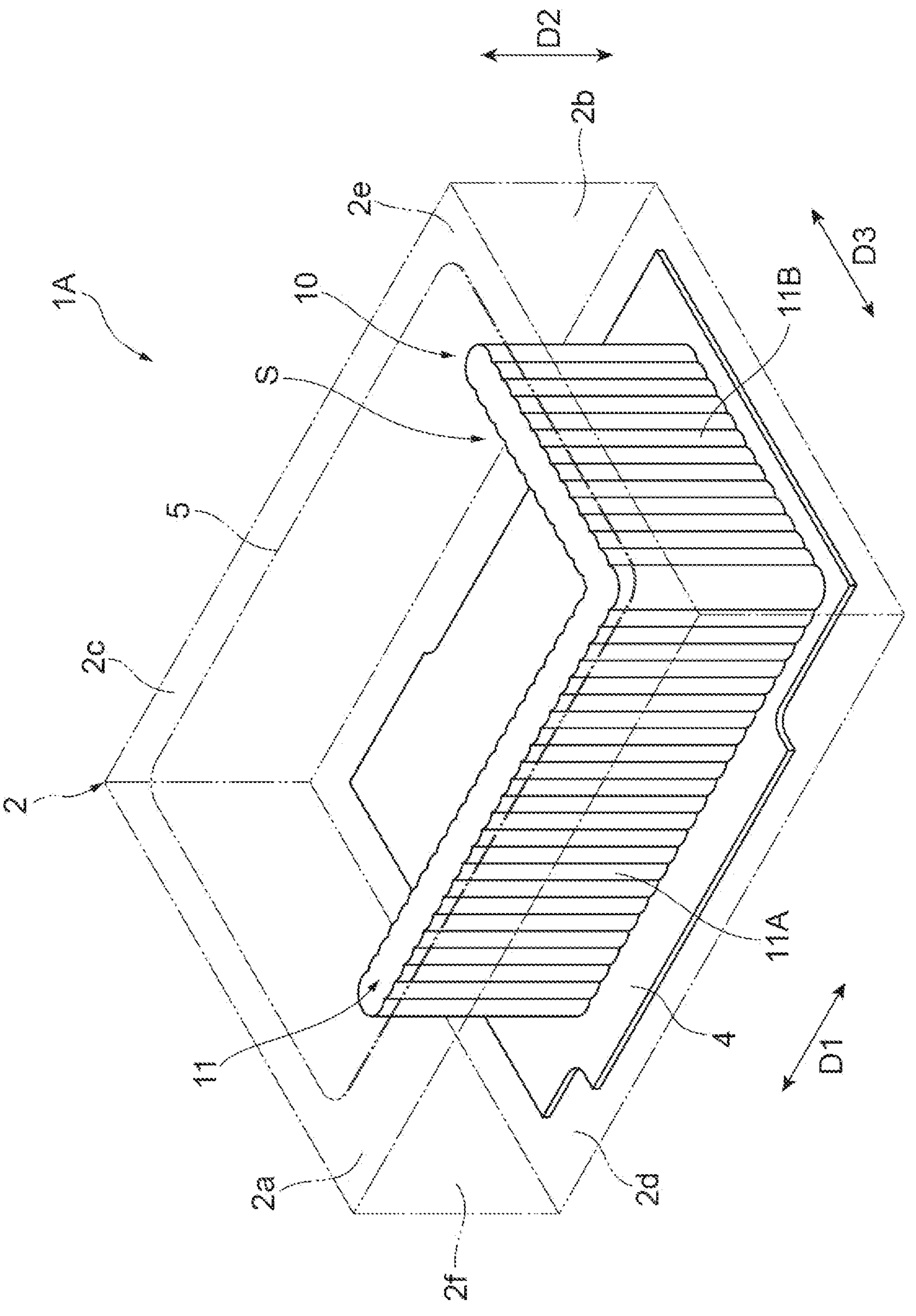
FIG. 8 is a transparent perspective view of an electronic component according to a second embodiment.
Figure 9:
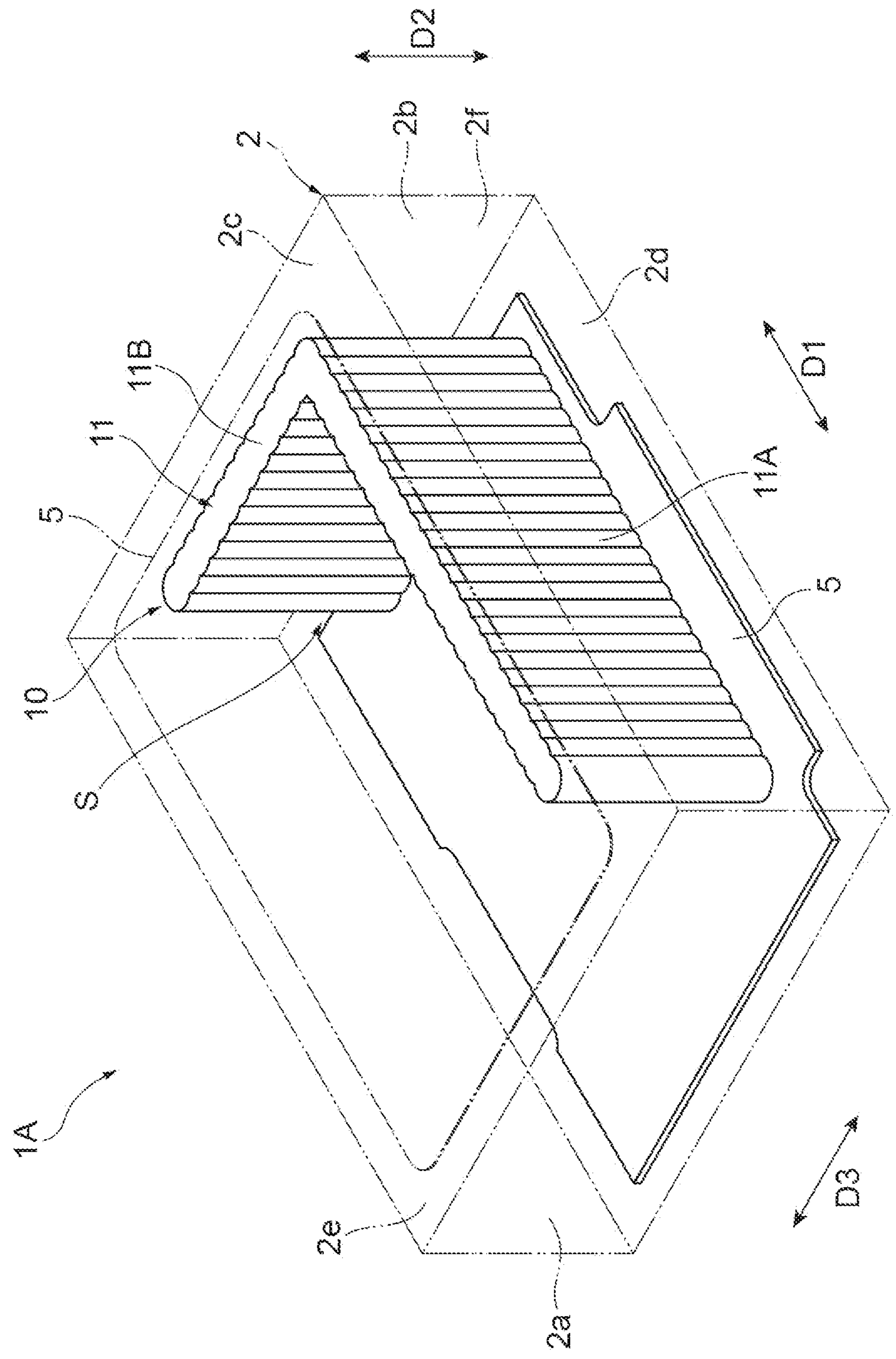
FIG. 9 is a transparent perspective view of the electronic component illustrated in FIG. 8.
Figure 10:
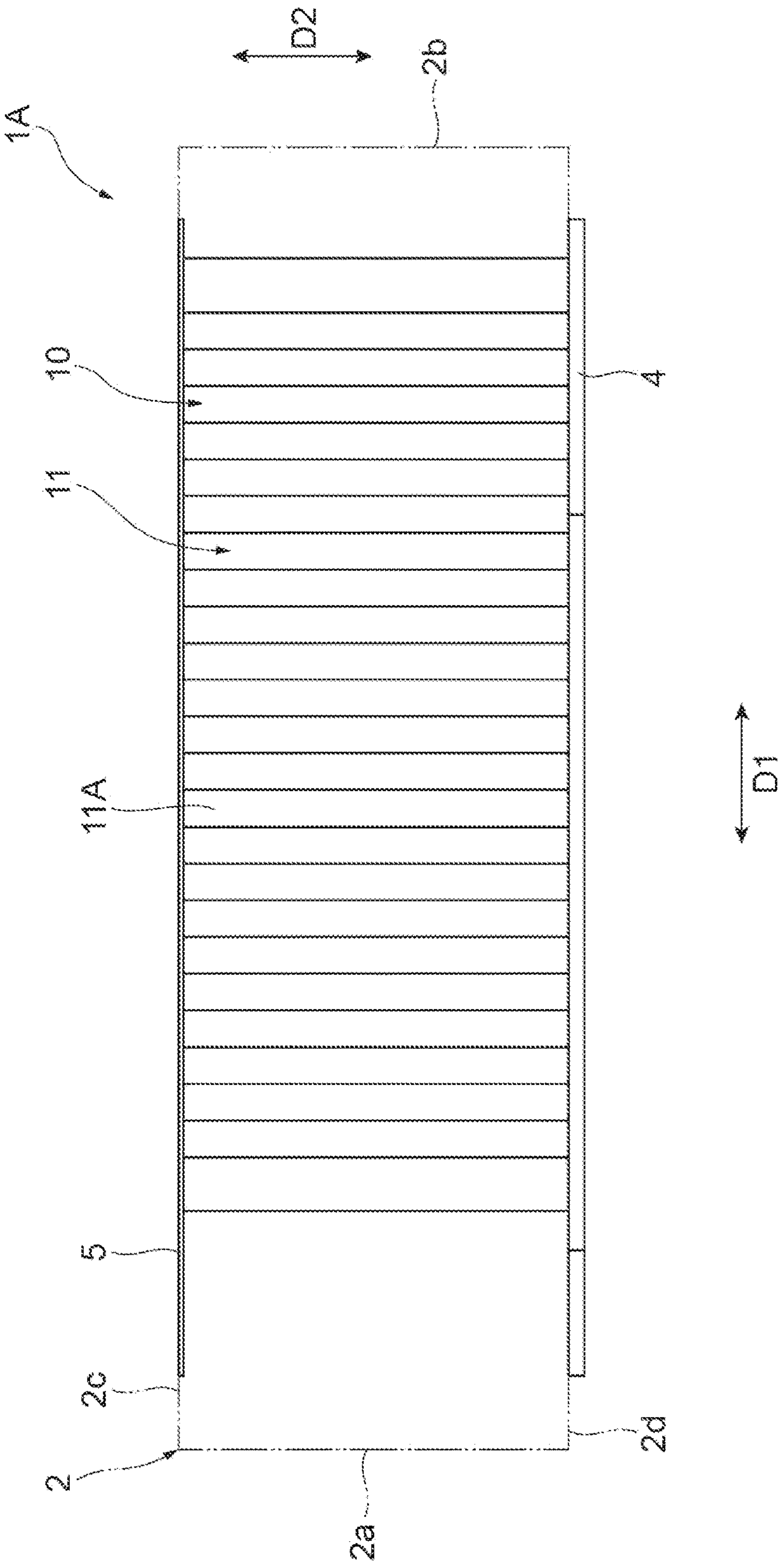
FIG. 10 is a side view of the electronic component illustrated in FIG. 8.
Figure 11:
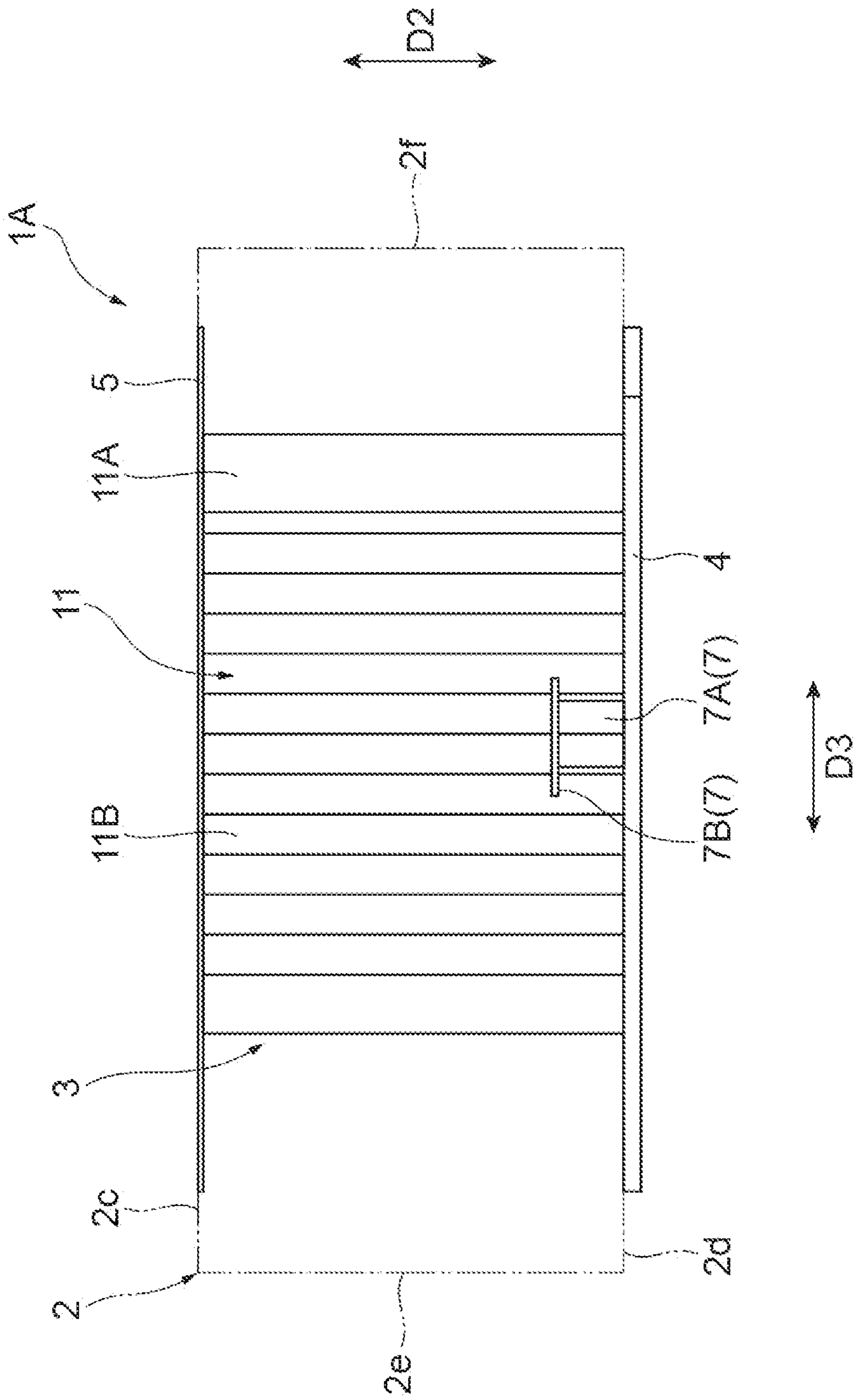
FIG. 11 is an end view of the electronic component illustrated in FIG. 8.
Figure 12:
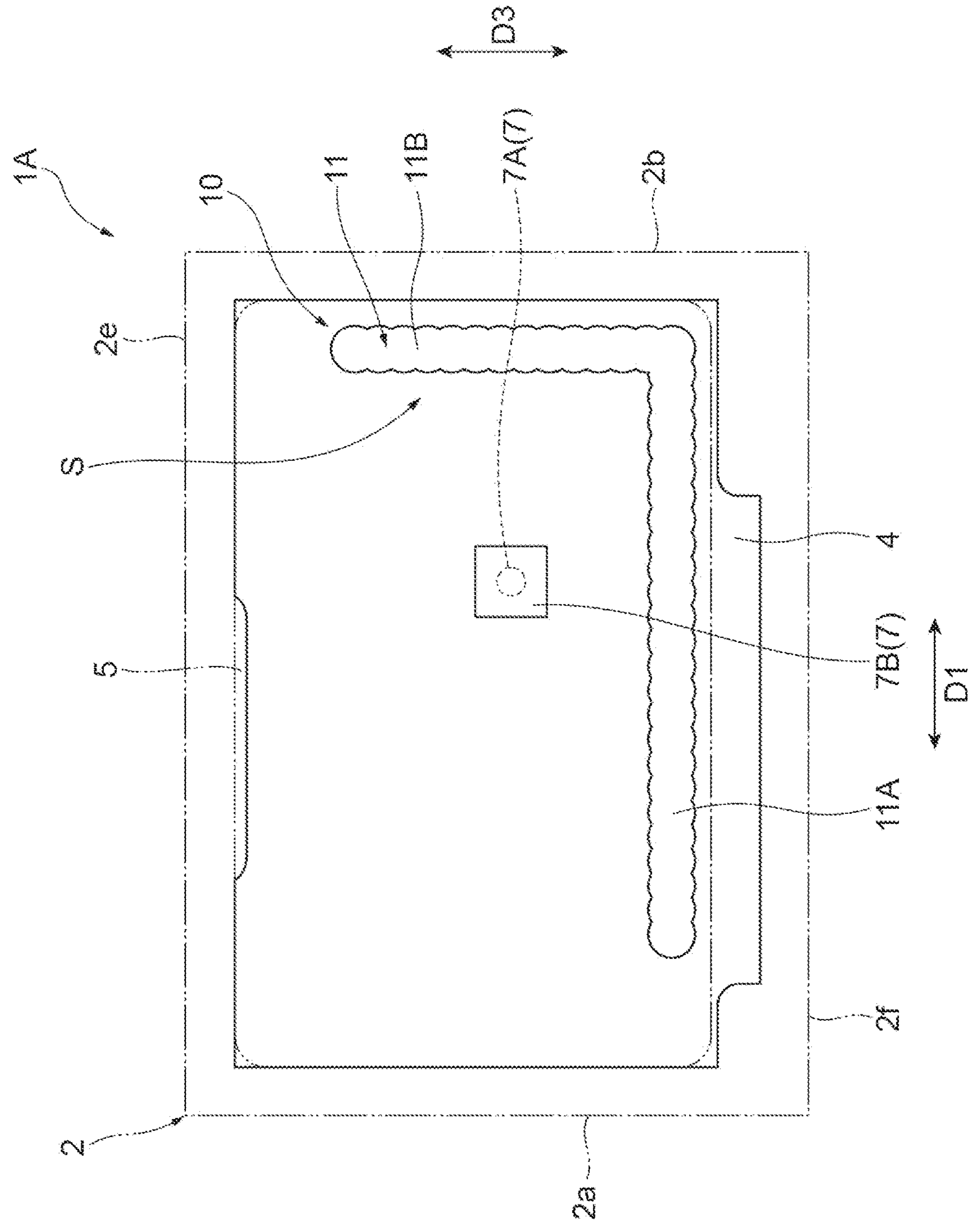
FIG. 12 is a top view of the electronic component illustrated in FIG. 8.

Next, an electronic component according to a second embodiment will be described with reference to FIGS. 8, 9, 10, 11, and 12. FIG. 8 is a transparent perspective view of the electronic component according to the second embodiment. FIG. 9 is a transparent perspective view of the electronic component illustrated in FIG. 8. FIG. 10 is a side view of the electronic component illustrated in FIG. 8. FIG. 11 is an end view of the electronic component illustrated in FIG. 8. FIG. 12 is a top view of the electronic component illustrated in FIG. 8. As illustrated in FIGS. 8 to 12, an electronic component 1A includes an element body 2 and a resonator 10. In FIGS. 8 to 12, the element body 2 is indicated by a dashed dotted line. In FIGS. 8, 9, and 12, the second conductor 5 is indicated by a broken line.

The resonator 10 includes a first conductor 4, a second conductor 5, a coupling conductor 11, and an internal conductor 7. The resonator 10 is a TE mode cavity resonator.

The coupling conductor 11 couples the first conductor 4 and the second conductor 5. The coupling conductor 11 is made of a conductive material (for example, Cu). The coupling conductor 11 extends in the second direction D2. The coupling conductor 11 has an L-shape when viewed from the second direction D2. The coupling conductor 11 includes a plurality of conductor portions. The coupling conductor 11 has a first coupling portion 11A extending in the first direction (one direction) D1 and a second coupling portion 11B extending in the third direction (one direction) D3 when viewed from the second direction D2. The first coupling portion 11A and the second coupling portion 11B are integrally formed. The first coupling portion 6A and the second coupling portion 6B form a right angle. An end portion of the first coupling portion 11A on the end surface 2*b* side and an end portion of the second coupling portion 11B on the side surface 2*f* side are coupled.

Figure 13:
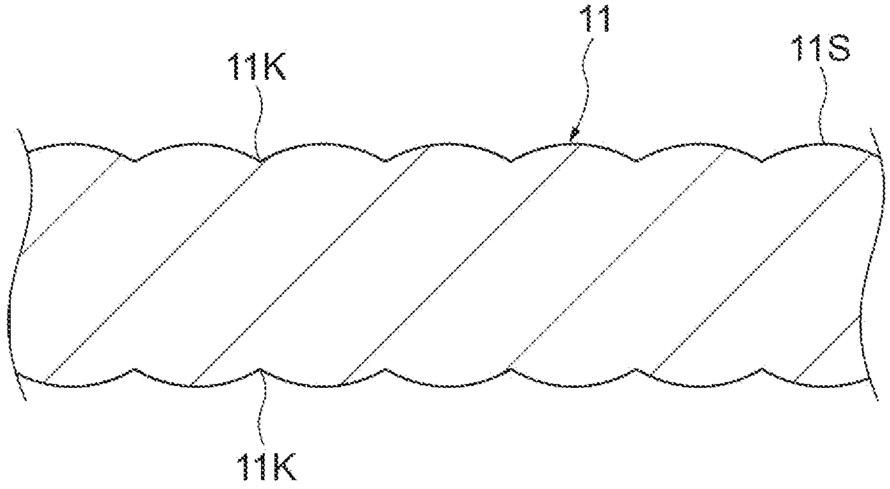
FIG. 13 is a view illustrating a cross-sectional configuration of a conductor.

FIG. 13 is a view illustrating a cross-sectional configuration of the coupling conductor 11. A cross section of the coupling conductor 11 illustrated in FIG. 13 is a cross section of a plane along the first direction D1 and the third direction D3. In the present embodiment, the coupling conductor 11 has a shape in which a plurality of circles overlap. Specifically, the coupling conductor 11 has a shape in which a part of each of a pair of adjacent circles overlaps. For example, two adjacent circles overlap each other such that an outer periphery of one circle passes through a center of the other circle. A side surface 11S of the coupling conductor 11 is configured as a curved surface.

The side surface 11S of the coupling conductor 11 is provided with a plurality of depressions 11K. The depressions 11K extend in the second direction D2. In the first coupling portion 11A, the depressions 11K are disposed at predetermined intervals in the first direction D1. In the second coupling portion 11B, the depressions 11K are disposed at predetermined intervals in the third direction D3. In the first coupling portion 11A, the depressions 11K are disposed at positions facing each other in the third direction D3. In the second coupling portion 11B, the depressions 11K are disposed at positions facing each other in the first direction D1.

As described above, in the electronic component 1A according to the present embodiment, the coupling conductor 11 includes the first coupling portion 11A and the second coupling portion 11B. The first coupling portion 6A and the second coupling portion 6B extend in the first direction D1 or the third direction D3 when viewed from the second direction D2. As a result, in the electronic component 1A, it is possible to suppress the eddy current from being generated in a concentrated manner in the coupling conductor 11 as compared with a configuration in which the coupling conductor has a single columnar shape. Therefore, in the electronic component 1A, the loss due to the eddy current can be reduced. Therefore, in the electronic component 1A, a Q value can be improved.

In the electronic component 1A according to the present embodiment, the coupling conductor 11 is integrally provided with the first coupling portion 11A and the second coupling portion 11B, and has an L-shape when viewed from the second direction D2. In this configuration, since the radiation from the resonance space S is shielded by the coupling conductor 11 as compared with the configuration in which the plurality of coupling conductors are disposed apart from each other, the radiation loss can be reduced. Therefore, in the electronic component 1A, a Q value can be improved.

Although the embodiments of the present disclosure have been described above, the present disclosure is not necessarily limited to the above-described embodiments, and various modifications can be made without departing from the gist thereof.

In the embodiment described above, an aspect in which the coupling conductor 6 has a frame shape when viewed from the second direction D2 has been described as an example. In addition, an aspect in which the coupling conductor 11 has an L-shape when viewed from the second direction D2 has been described as an example. However, the shape of the coupling conductor is not limited thereto. In the coupling conductor, at least a part of the plurality of coupling portions may extend in one direction when viewed from the second direction D2.

In the above embodiment, an aspect in which the coupling conductor 6 and the coupling conductor 11 have a shape in which three circles overlap each other and have the depressions 6K and 11K has been described as an example. However, the shapes of the coupling conductor 6 and the coupling conductor 11 are not limited thereto. The coupling conductor 6 and the coupling conductor 11 may have, for example, a rectangular shape, an elliptical shape, or the like.

In the above embodiments, an aspect in which the internal conductor 7 is coupled to the first conductor 4 has been described as an example. However, the internal conductor 7 may be coupled to the second conductor 5. The internal conductor 7 may not be coupled to either the first conductor 4 or the second conductor 5.

In the above embodiments, an aspect in which one of the resonators 3 and 10 is disposed in the element body 2 has been described as an example. However, a plurality of resonators may be disposed in the element body 2. In this configuration, the internal conductor may be disposed in at least one of the plurality of resonators.

What is claimed is:

1. An electronic component comprising:
  an element body having a pair of main surfaces facing each other; and
  a resonator disposed in the element body, wherein
  the resonator has
    a first conductor and a second conductor disposed to face each other in a facing direction of the pair of main surfaces, and
    a coupling conductor extending in the facing direction and coupling the first conductor and the second conductor,
  a resonance space is formed by the first conductor, the second conductor, and the coupling conductor, and
  the coupling conductor includes a plurality of coupling portions each extending in the facing direction, the plurality of coupling portions being arranged one after another in a one direction that is orthogonal to the facing direction, at least two coupling portions of the plurality of coupling portions adjacent with each other in the one direction being in direct contact with each other and being continuous from each other, the plurality of coupling portions forming an integral conductor.

2. The electronic component according to claim 1, wherein the coupling conductor has a frame shape when viewed from the facing direction.

3. The electronic component according to claim 1, wherein the coupling conductor has an L-shape when viewed from the facing direction.

4. The electronic component according to claim 1, wherein a side surface of the coupling conductor is provided with a plurality of depressions, and the plurality of depressions are disposed to face each other in another direction orthogonal to the one direction and extend in the facing direction when viewed from the facing direction.

5. The electronic component according to claim 1, wherein an internal conductor extending in the facing direction is disposed in the resonance space.

6. The electronic component according to claim 5, wherein the internal conductor is coupled to the first conductor or the second conductor.

7. The electronic component according to claim 5, wherein the internal conductor is not coupled to the first conductor and the second conductor.

8. The electronic component according to claim 5, wherein a plurality of the resonators are disposed in the element body, and the internal conductor is disposed in the resonance space of at least one of the plurality of resonators.

* * * * *